US006048010A

United States Patent [19]

Stocker

[11] Patent Number: 6,048,010

[45] Date of Patent: Apr. 11, 2000

[54] APPARATUS FOR MANIPULATING SUSPENDED DISPLAY SYSTEMS

[76] Inventor: Harold L. Stocker, 979 Baytree Dr., Bartlett, Ill. 61013

[21] Appl. No.: 09/061,760

[22] Filed: Apr. 16, 1998

[51] Int. Cl.[7] ................................ A47F 13/06; B25J 1/00

[52] U.S. Cl. .......................... 294/19.1; 248/544; 248/343

[58] Field of Search ........................... 294/19.1, 22, 50.9, 294/85, 103.1; 40/600, 617; 248/206.5, 343, 544; 81/53.1, 53.11, 487

[56] References Cited

U.S. PATENT DOCUMENTS

| | | | |
|---|---|---|---|
| 1,426,220 | 8/1922 | Sajtar | 294/19.1 |
| 2,487,738 | 11/1949 | Stehberger | 294/19.1 |
| 3,185,514 | 5/1965 | Foster | 81/53.11 |
| 3,350,045 | 10/1967 | Mayers . | |
| 3,561,718 | 2/1971 | Iverson | 294/19.1 |
| 3,646,645 | 3/1972 | Bauer | 294/19.1 |
| 3,743,339 | 7/1973 | Brackett | 294/19.1 |
| 3,984,931 | 10/1976 | Belokin, Jr. . | |
| 4,089,553 | 5/1978 | Frykholm | 294/19.1 |
| 4,223,488 | 9/1980 | Schoenung . | |
| 4,257,342 | 3/1981 | Ditto . | |
| 4,392,316 | 7/1983 | Thomas . | |
| 4,564,165 | 1/1986 | Grant et al. . | |
| 4,901,456 | 2/1990 | Cotutsca . | |
| 4,960,258 | 10/1990 | Stocker et al. . | |
| 5,052,733 | 10/1991 | Cheung et al. | 294/19.1 |
| 5,188,332 | 2/1993 | Callas . | |
| 5,247,725 | 9/1993 | Vaughn, Jr. | 294/19.1 |
| 5,381,991 | 1/1995 | Stocker . | |

*Primary Examiner*—Dean J. Kramer

*Attorney, Agent, or Firm*—Leydig, Voit & Mayer Ltd.

[57] ABSTRACT

A tool for manipulating suspended display holders such that a user can mount suspended displays on and remove suspended displays from an overhead support structure from floor level is provided. The tool includes an elongate handle having an upper end on which is arranged a gripping head. The gripping head includes a channel portion which can be brought into engagement with a suspended display holder and a clamp member which is mounted on the gripping head for sliding movement between a position wherein the gripping head engages the suspended display holder and a retracted released position. The slide member is biased towards the engaged position by a spring which is provided on the gripping head. The tool also includes an actuating cord which can be used to effect movement of the clamp member between the engaged and retracted positions.

15 Claims, 11 Drawing Sheets

APPARATUS FOR MANIPULATING SUSPENDED DISPLAY SYSTEMS

FIELD OF THE INVENTION

This invention generally relates to devices for manipulating suspended displays and, more particularly to an apparatus for mounting suspended displays on and removing them from an overhead support structure.

BACKGROUND OF THE INVENTION

In retailing establishments such as department stores, supermarkets and the specialty stores, suspending displays such as signs, flags, mobiles and the like from the ceiling is a widely used to technique to promote products in order to help stimulate sales. Because, in most cases, the displays are frequently changed based on the particular promotions which the retail store is running, the displays are typically suspended from the ceiling using some type of easily releasable fasteners such as magnets which are provided on a suspended display holder. The display itself is hung from the display holder by strings, wire hangers or the like.

Hanging the displays can be a very labor intensive and time-consuming exercise which requires the use of ladders, scaffolding and/or lifting apparatus. These difficulties are particularly acute when the displays are being hung in congested areas of the store. Accordingly, tools having elongated handles which enable individuals to hang and remove suspended signs from a ceiling have been developed. One example of such a tool is disclosed in U.S. Pat. No. 5,188,332.

The tools that are presently available, however, are plagued by several significant problems. In particular, conventional tools can be difficult to operate requiring a great deal of manual dexterity and hand-eye coordination. For example, the tool disclosed in the aforementioned U.S. Pat. No. 5,188,332 has pivoting jaws which require a relatively substantial amount of force to operate making it quite difficult to the tool steady to grab or release an object at the same time the jaws are being operated. Moreover, the engagement of the tool with the display unit is loose and not very secure which can lead to difficulty in manipulating the display. In addition, the presently available tools are not compatible with many of the types of display hanging systems which are presently in use. Thus, if a store does not want to be limited to certain types of suspended display systems, they often must have a number of different display hanging tools on hand in order to work with the different types of suspended display systems.

OBJECTS AND SUMMARY OF THE INVENTION

Accordingly, in view of the foregoing it is a general object of the present invention, to overcome the problems associated with prior art suspended display manipulating tools.

A more specific object of the present invention is to provide a manipulating tool as characterized above which is easy to operate.

Another object of the present invention is to provide a manipulating tool as characterized above which can be used with suspended display holders having a variety of different configurations.

A further object of the present invention is to provide a manipulating tool as characterized above which securely and firmly engages the suspended display holder.

These and other features and advantages of the invention will be more readily apparent upon reading the following description of a preferred exemplary embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENT

Figure 1:
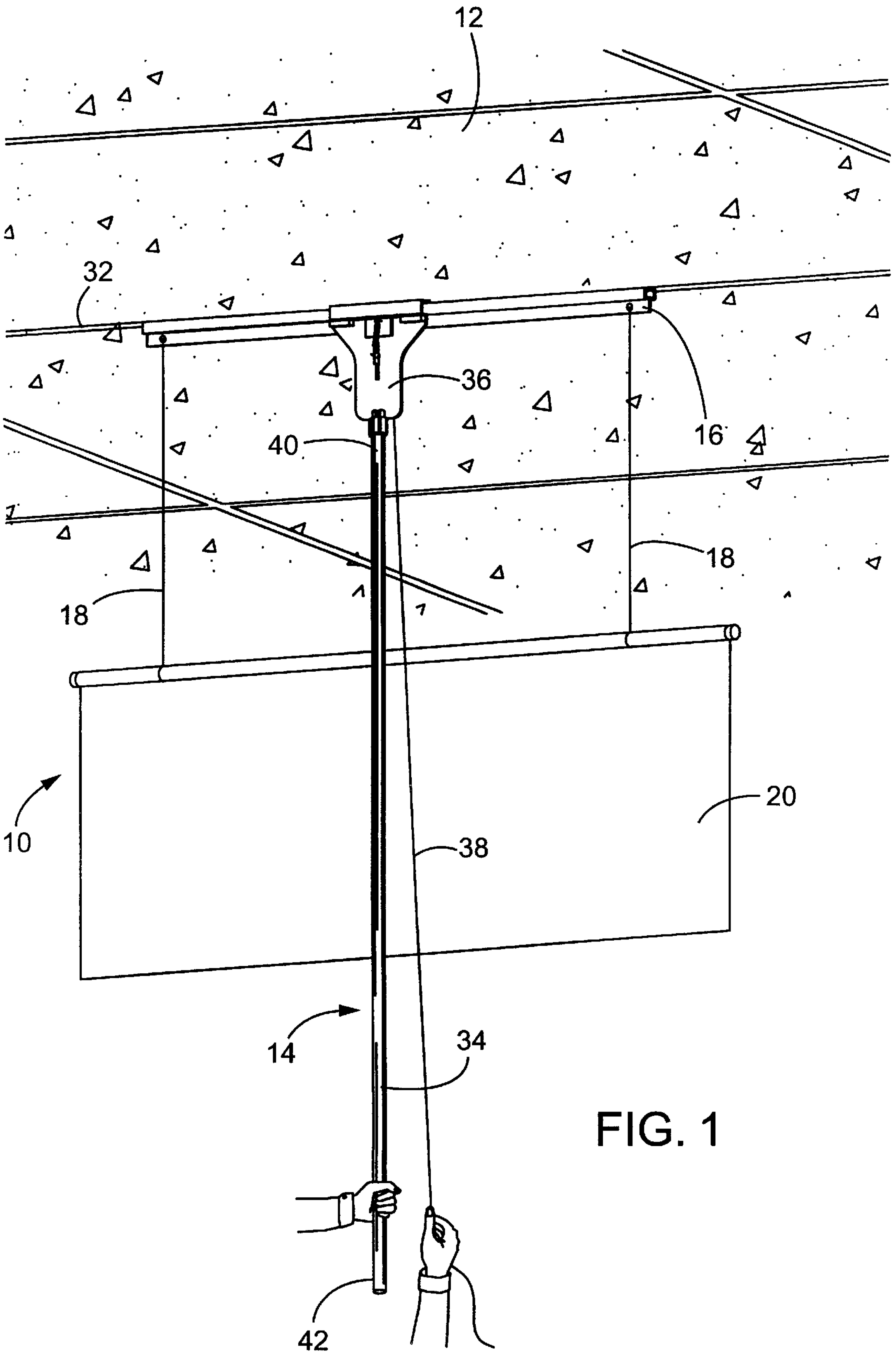
FIG. 1 is perspective view showing an illustrative suspended display manipulating tool being used to manipulate a suspended display holder in relation to a ceiling in accordance with the teachings of the present invention.

Referring now more particularly to FIG. 1, there is shown an illustrative example of how a suspended display system 10 may be manipulated in relation to a ceiling 12 using an exemplary embodiment of a manipulating tool 14 constructed in accordance with the teachings of the present invention. The suspended display system 10, in this instance, comprises an elongate suspended display holder 16, a plurality of elongate hangers 18 and a display 20. While the present invention is described in connection with a particular type of suspended display system, it will be readily appreciated that it is equally applicable to other types of suspended display systems. For example, in addition to conventional signs, the display system could be configured to support displays 20 having any number of different configurations including flags, mobiles or some combination of different types of displays.

In the illustrated embodiment, the suspended display holder 16, which may be constructed of a suitable plastic or metal material, includes a hollow tubular upper section 22 and a flange 24 arranged in downwardly dependent relation from the underside of the upper section. The hollow tubular upper section 22 is defined by an elongate planar central portion 25 and a pair of elongate inverted L-shaped portions 26 which extend upwardly from opposing sides of the central portion. The tubular enclosure which is formed by the planar central portion 25 and the pair of inverted L-shaped portions 26 provides the suspended display holder 16 with structural stability which enables the suspended display holder to be relatively inflexible and thereby easier to manipulate. The downwardly depending flange portion 24 provides further structural support for the suspended display holder 16 and includes, in the illustrated embodiment, a pair of longitudinally spaced apertures 28 to which the hangers 18 may be selectively and removably attached for supporting the display 20.

The hangers 18 generally consist of a relatively stiff metal wire which has hooks formed at either end thereof. One of the hooked ends of each hanger 18 is configured to engage one of the apertures 28 in the flange portion 24 while the other hooked end is configured to engage either the display 20 itself or some type of display support member. It will be appreciated, however, that other types of hangers 18 may be used including, for example, strings, chains or the like. Moreover, for some types of displays 20, such as mobiles, hanging baskets and the like, the display system may only include a single hanger 18.

Figure 2:
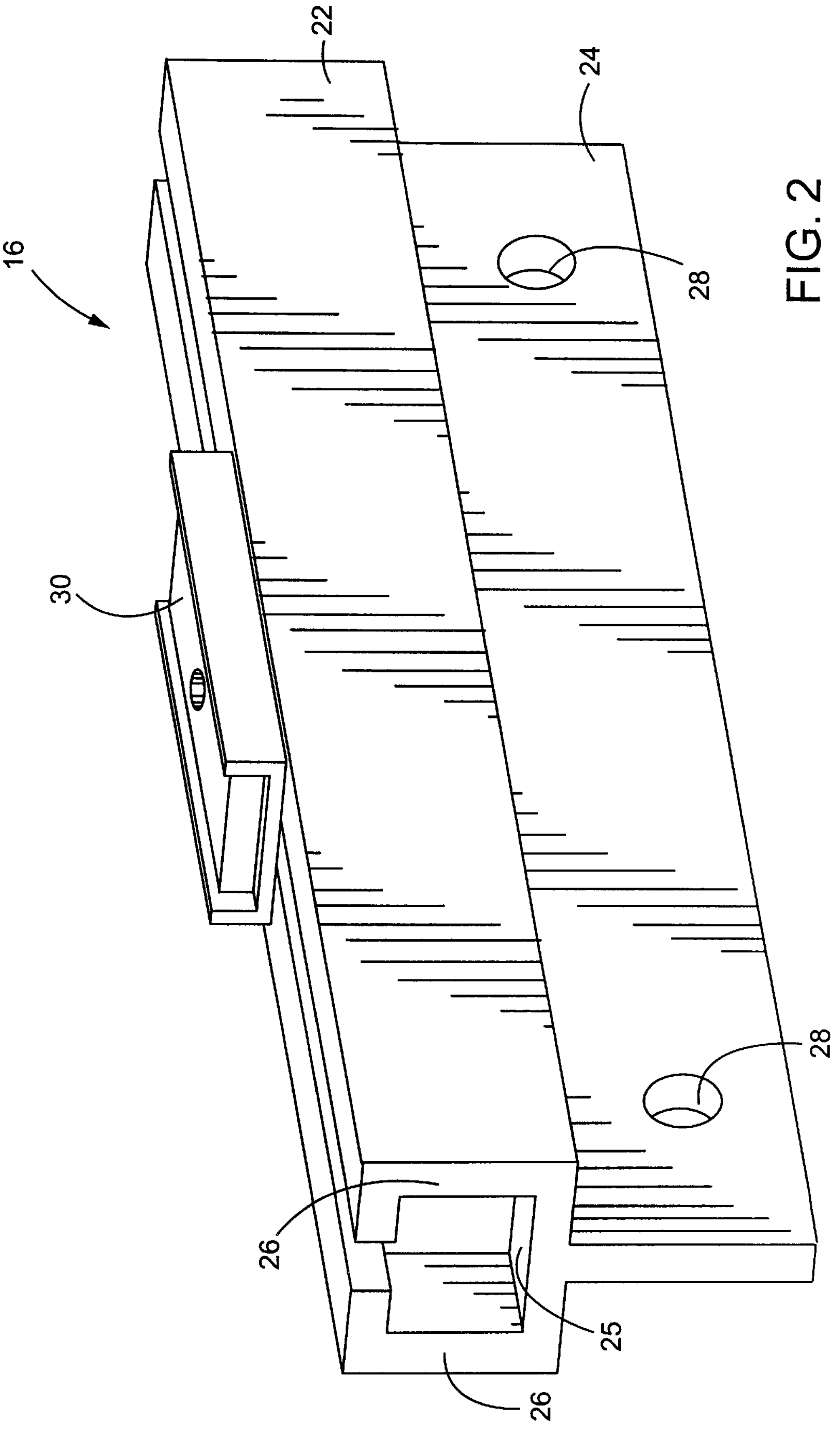
FIG. 2 is a perspective view of the exemplary suspended display holder of FIG. 1.

For releasably connecting the suspended display holder 16 to an overhead support structure, such as a ceiling 12, the suspended display holder 16 includes at least one magnet 30. As shown in FIG. 2, in this case, a single magnet 30 is provided on the upper surface of the suspended display holder 16. The magnet 30 preferably is slidably mounted on the upper surface of the suspended display holder 16 such that the position of the magnet relative to the suspended display holder may be selectively adjusted in order to facilitate the connection of the suspended display holder to a metallic portion of a ceiling 12 in the appropriate orientation. For example, as shown in FIG. 1, the magnet 30 can engage the metallic grid portion 32 of the type of suspended ceiling which is found in many retail stores. Specifically, as is known in the art, suspended ceilings typically employ a grid comprising a series of interconnected metal runners which are adapted to support the edges of the acoustic tiles or other panels which make up the suspended ceiling. These metal runners provide a convenient surface which the magnet 30 can engage in order to secure the suspended display holder 16 to the ceiling 12. Several different embodiments of similar suspended display holders which can be selectively attached to an overhead support structure via magnets and which allow for selective adjustment of the suspended display holder relative to the magnets are disclosed in U.S. Pat. No. 5,381,991 which is incorporated herein by reference.

In accordance with an important aspect of the present invention, a manipulating tool 14 is provided which can be used from floor level to mount the suspended display system 10 on, and remove it from, an overhead support structure, e.g. a suspended ceiling 12. Thus, the manipulating tool 14 eliminates the need to use ladders and/or scaffolding in order to hang suspended displays from a ceiling. As shown in FIG. 1, the manipulating tool 14 generally comprises an elongated handle 34, a gripping head 36 and an actuating cord 38. The handle 34 has an upper end 40 on which the gripping head 36 is attached and a lower end 42 which can be grasped by a user. The handle 34 preferably has sufficient length to enable a user standing at floor level to comfortably reach a typical suspended ceiling. Alternatively, the handle 34 can include a plurality of telescoping sections which enable the length of the handle to be selective adjusted based on the height of the ceiling. The gripping head 36, which can be constructed of any suitable plastic, metal or wood material, is attached to upper end 40 of the handle 34, in this case, by mating threads on the gripping head 36 and the upper end of the handle. It will be appreciated, however, that any suitable fastening means may be used to connect the gripping head 36 to the upper end of the handle 34 including, for example, a snap-lock, screw or locking pin.

Figure 3:
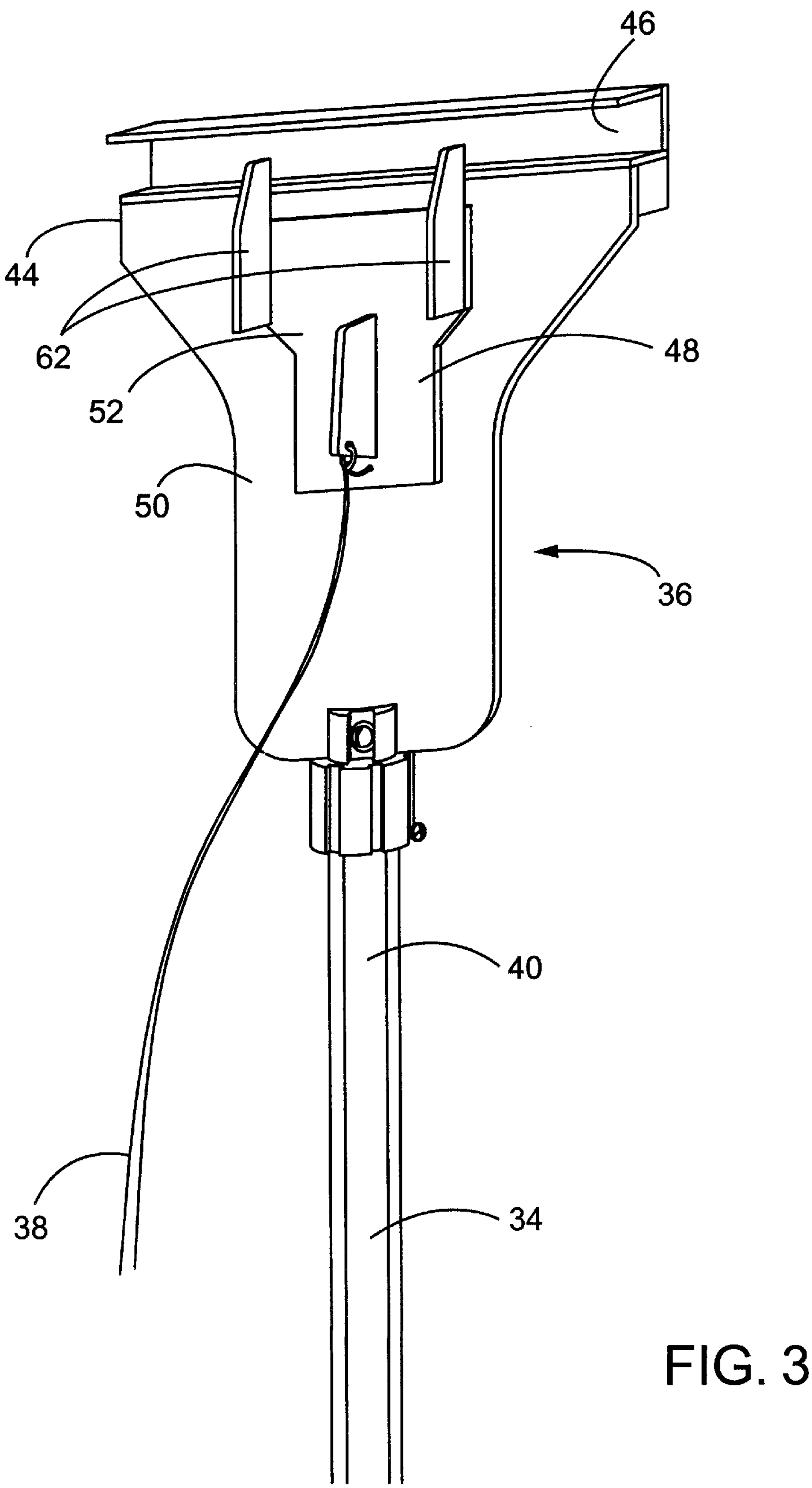
FIG. 3 is a front perspective view of the gripping head of the suspended display manipulating tool of FIG. 1 with the clamp member in the closed position.
Figure 5:
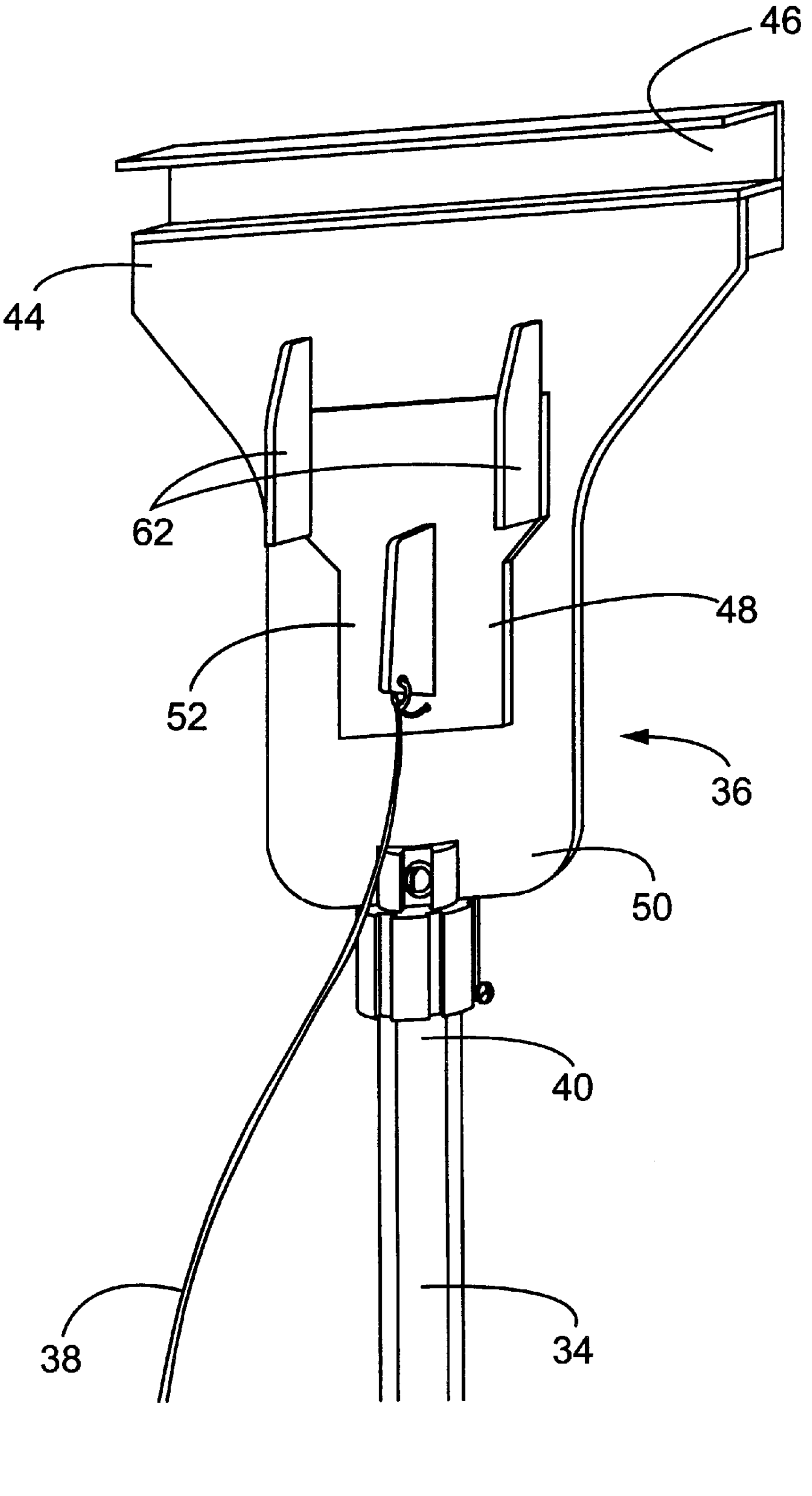
FIG. 5 is a front perspective view of gripping head of the manipulating apparatus of FIG. 1 with the clamp member slidably retracted.
Figure 7:
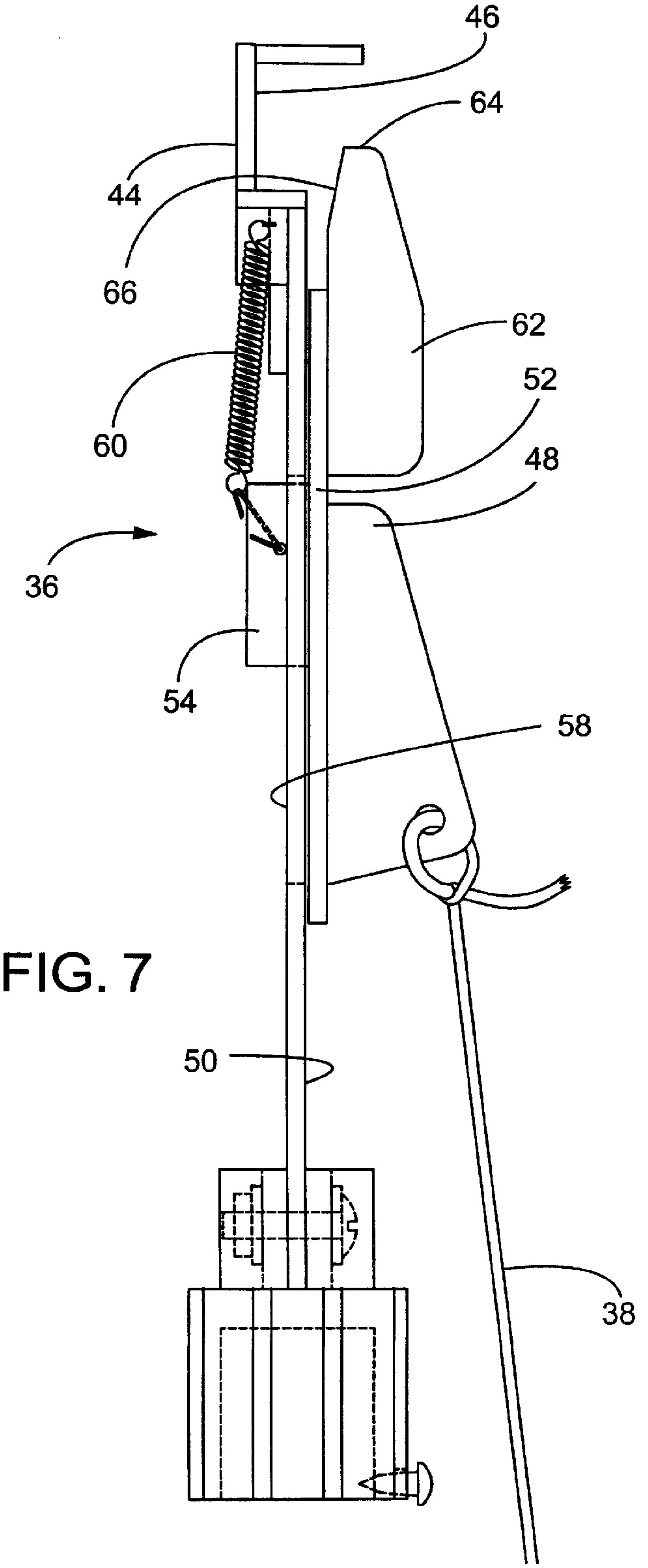
FIG. 7 is a side view of the gripping head of the suspended display manipulating tool of FIG. 1.
Figure 8:
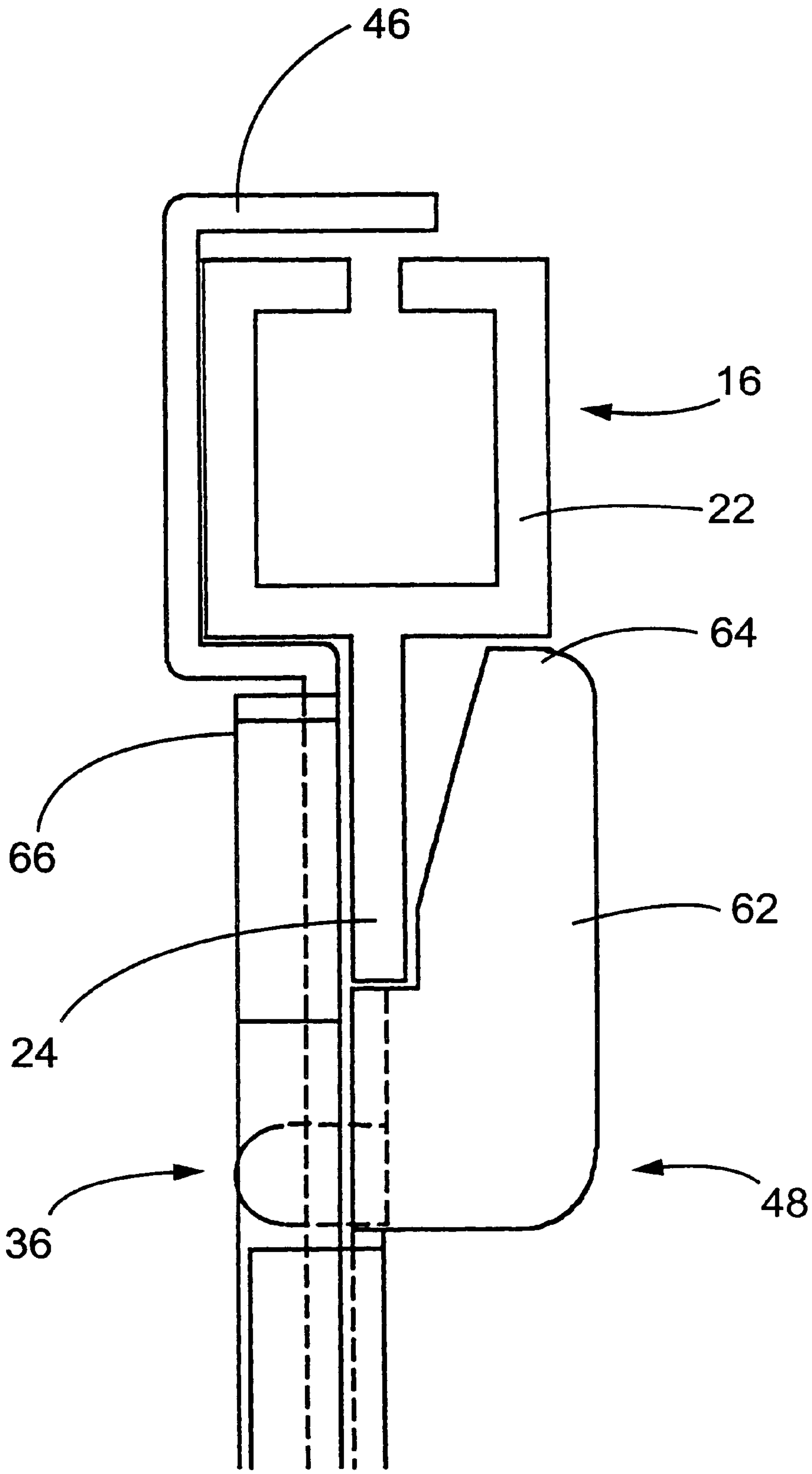
FIG. 8 is an enlarged partial side view of the suspended display manipulating tool of FIG. 1 showing the gripping head engaged with a suspended display holder.
Figure 9:
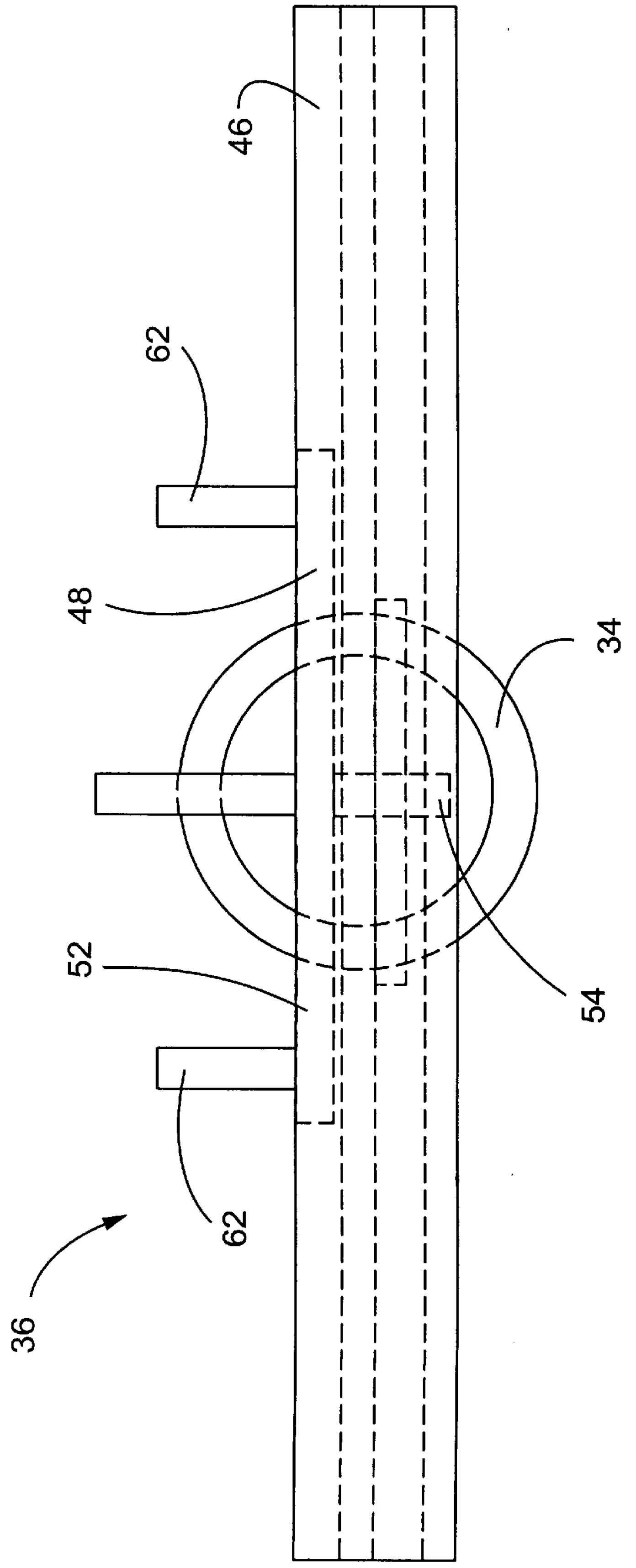
FIG. 9 is a top view of the suspended display manipulating tool of FIG. 1.

In order to enable the tool 14 to manipulate a suspended display system 10, the gripping head 36 has an upper end 44 which defines a channel shaped member 46 which, in conjunction with a sliding clamp member 48, define jaws which are selectively operable to grasp a suspended display holder 16 of a suspended display system. In particular, as best shown in FIGS. 3, 5 and 7, the upper end 44 of the gripping head 36 is configured as a forwardly facing channel 46 which is open at either end and extends along the entire length of the upper end of the gripping head. As shown in FIG. 8, the channel member 46 is sized to partially surround the upper portion 22 of the suspended display holder 16 when the gripping head 36 is brought into engagement with the suspended display holder. In addition to being molded as part of the gripping head 36, the channel member 46 could be configured as a separate piece which is connected to the upper end of the head.

Figure 4:
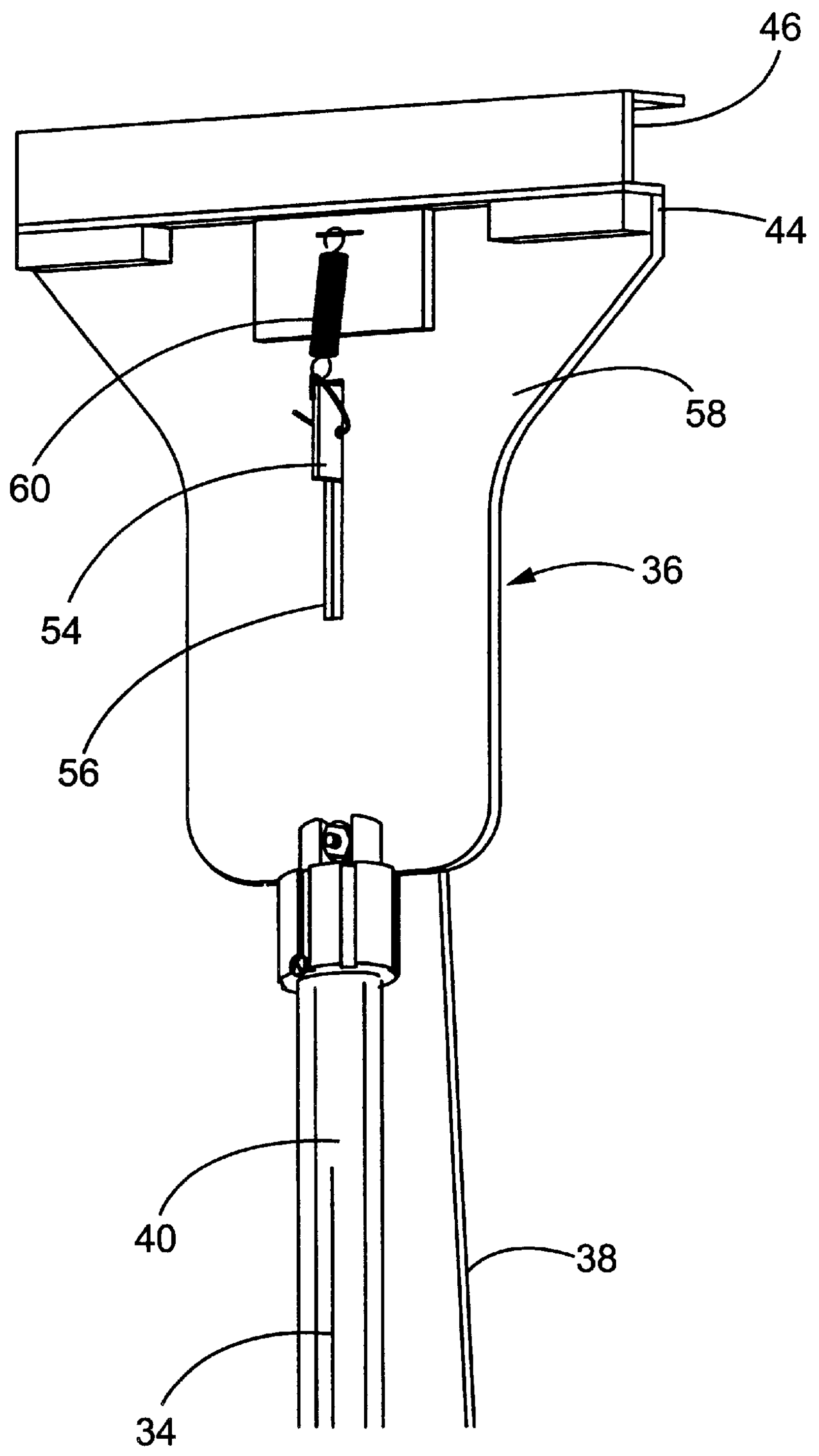
FIG. 4 is a rear perspective view of the gripping head of the suspended display manipulating tool of FIG. 1 with the clamp member in the closed position.
Figure 6:
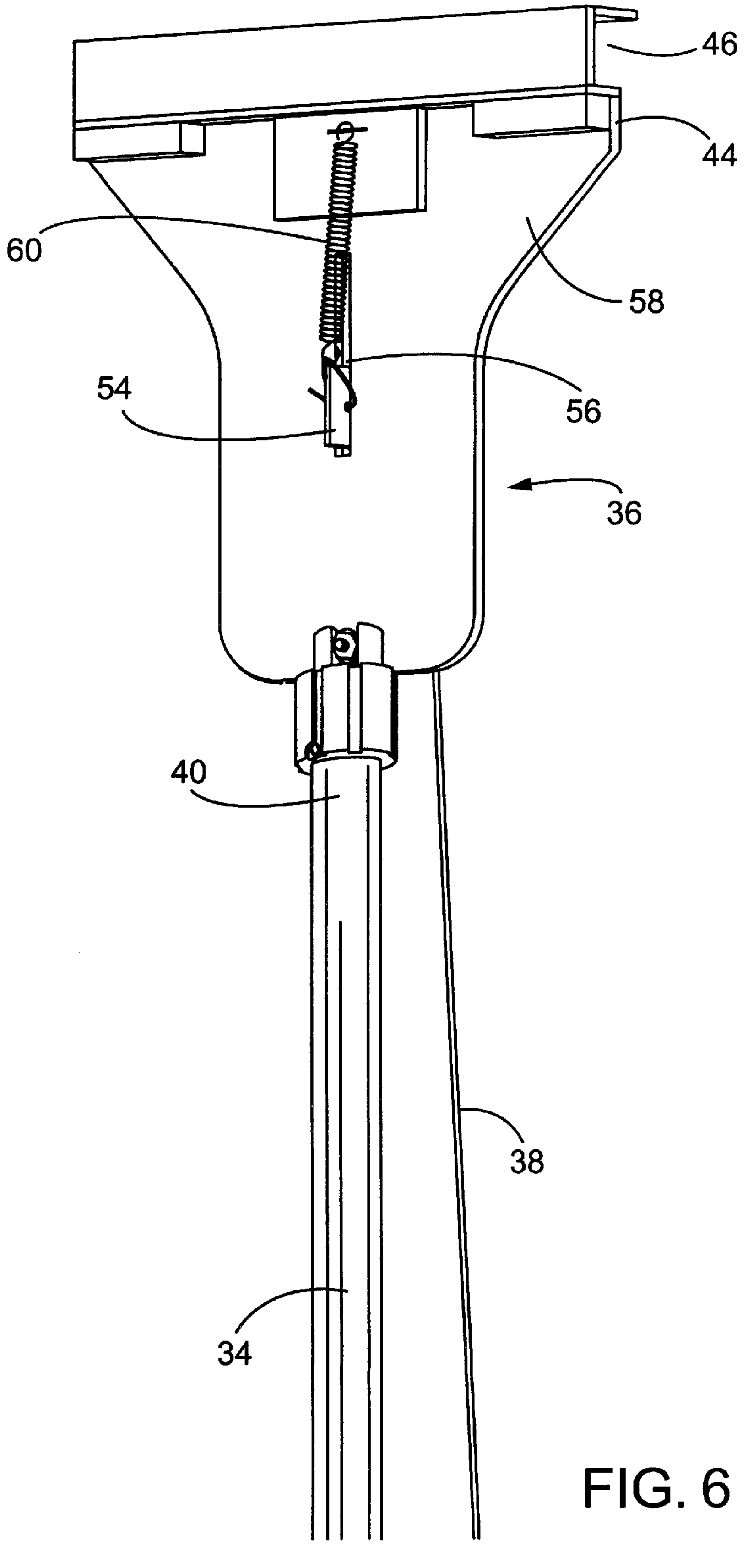
FIG. 6 is a rear perspective view of the gripping head of the suspended display manipulating tool of FIG. 1 with the clamp member slidably retracted.

For facilitating engagement of the gripping head 36 with the suspended display holder 16 and, once engaged, for firmly securing the gripping head 36 to the suspended display holder 16, the clamp member 48 is mounted on the front face 50 of the head 36 for longitudinal sliding movement relative to the channel member 46 as shown in FIGS. 3 and 5. More particularly, in relation to a suspended display holder 16, the clamp member 48 is movable between a release position (shown in FIG. 5) and an engaged position (shown in FIG. 8). In the release position, the clamp member 48 is retracted away from the channel member so as to allow a suspended display holder 16 to be engaged by or released from the channel member 46. In the engaged position, the clamp member 48 engages a suspended display holder 16 contained within the channel member 46 in order to secure the suspended display holder 16 to the gripping head 36. For effecting this movement, the clamp member 48 includes a slide 52 which overlies a portion of and is parallel to the front face of the gripping head 36. The slide 52 includes a flange 54 which depends from the underside of the slide and extends through a longitudinally extending guide slot 56 in the head to the rear face 58 of the head 36. As will be appreciated, the engagement of the flange 54 with the guide slot 56 enables the clamp member 48 to move in a straight line, perpendicular to the channel member 46, as it slides relative to the gripping head 36. As shown in FIGS. 4 and 6, the portion of the flange 54 which extends through the guide slot 56 is connected to the rear face 58 of the head 36 via a spring 60. The spring 60, which in this case is a tension coil spring, has a first end connected to the rear face 58 of the head adjacent the channel member 46 and a second end which is connected to the flange 54. The spring 60 bias exerts an upward force on the clamp member 48 as it is retracted downwardly relative to the gripping head 36. Thus, when the force which is applied to retract the clamp member 48 is removed, the spring 60 will pull the clamp member 48 upwardly relative to the head 36.

Figure 10:
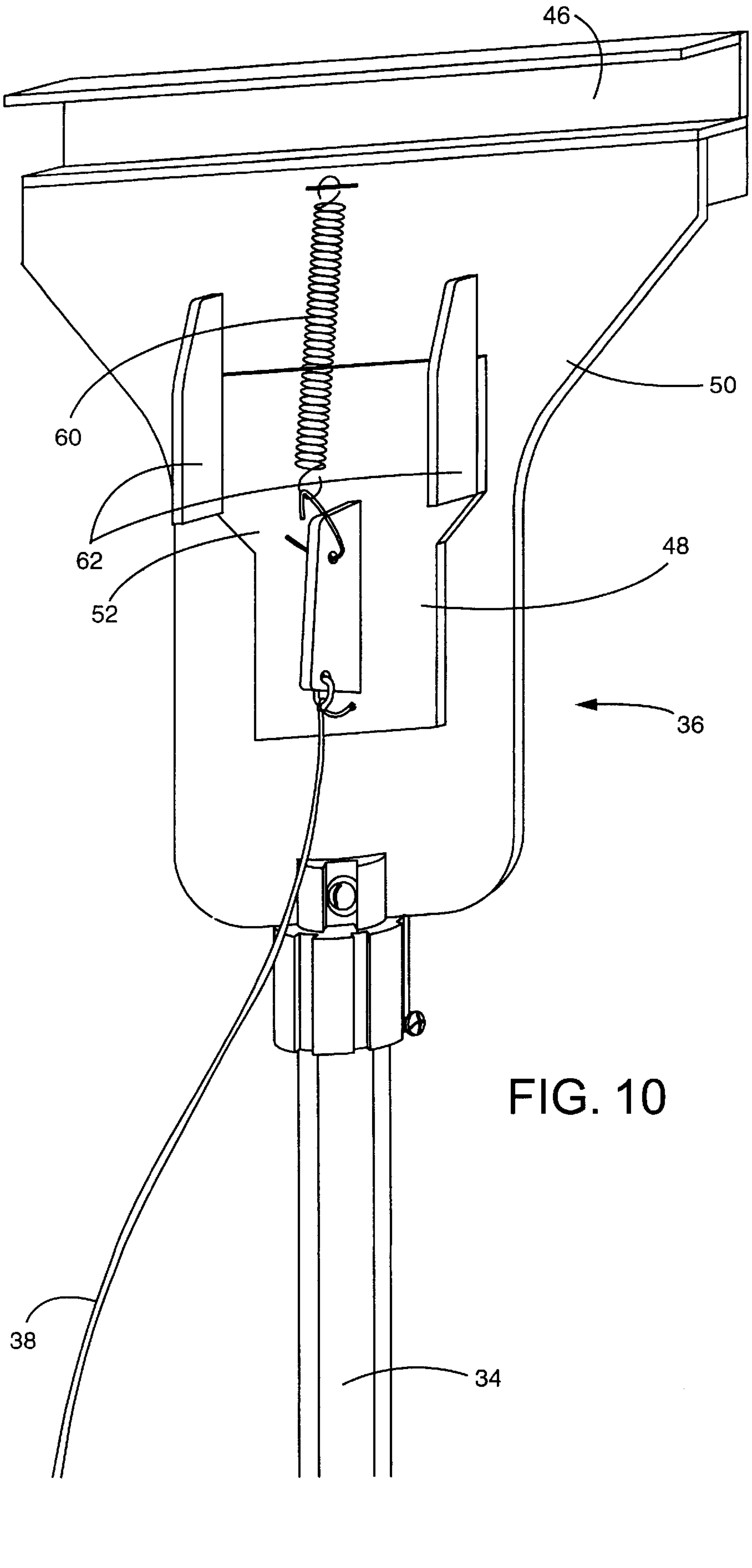
FIG. 10 is a front perspective view of an alternative embodiment of a suspended display manipulating tool constructed in accordance with the teachings of the present invention.
Figure 11:
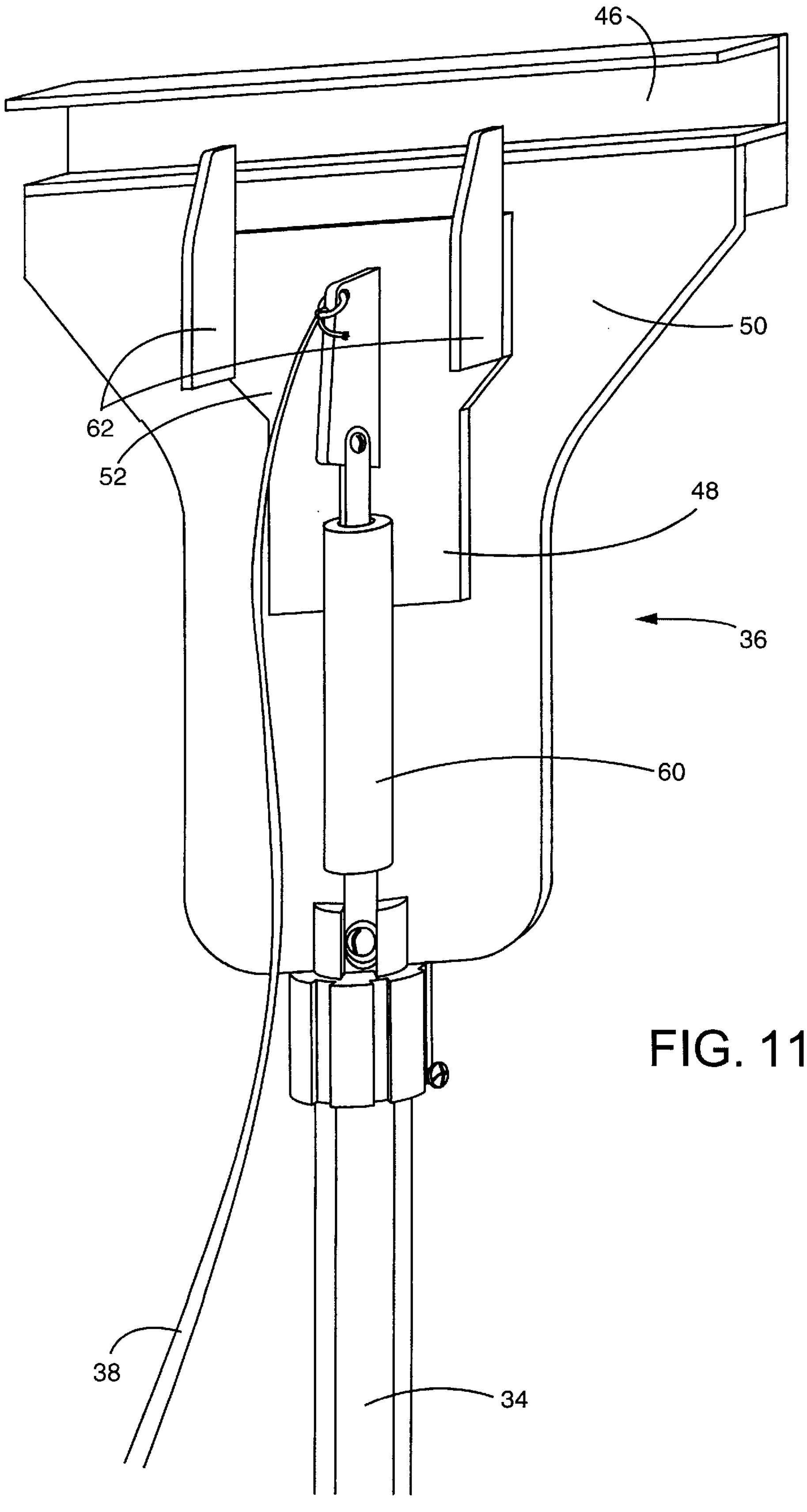
FIG. 11 is a front perspective view of an alternative embodiment of a suspended display manipulating tool constructed in accordance with the teachings of the present invention.

When the gripping head 36 is not engaged with a suspended display holder 16, the spring 60 will return to the clamp member to a "closed" position as shown in FIGS. 3 and 4 wherein the flange 54 is disposed at the upper end of the guide slot 56. When the gripping head 36 is engaged with a suspended display holder 16, the spring 60 ensures that clamp member 48 moves into a tight engagement position with the display holder 16 regardless of the relative size of the display holder 16, as shown in FIG. 8. Those skilled in the art will appreciated that other types of springs could be used as well as other arrangements for the spring so long as the spring applies an upward force on the sliding clamp member. For example, instead of a coil spring, a hairpin spring may be used. In addition, the spring 60 may be arranged on the front face 50 of the gripping head wherein it connects the gripping head 36 directly to the slide 52 as shown in FIG. 10. Alternatively, a compression spring 60 may be arranged below the slide member 52 on either the rear side or front side of the head as shown in FIG. 11.

The clamp member 48 further includes a pair of laterally spaced prongs 62 which extend upwardly and forwardly from the front surface of the slide 52 for facilitating engagement between the clamp member 48 and the suspended display holder 16. As shown in FIGS. 3 and 7, the prongs overlie a portion of the channel member 46 when the clamp member 48 is in the closed position. When the gripping head 36 is grasping a suspended display holder 16, the prongs 62 overlie and capture the flange portion 24 of the suspended display holder 16 as shown in FIG. 8. In addition, the upper edges 64 of the prongs 62 engage the underside of the upper section 22 of the suspended display holder thereby helping to secure the upper portion in the channel 46.

In order to facilitate bringing the clamp member 48 into engagement with the suspended display holder 16, the underside of each of the prongs 62 tapers away from the surface of the head 36 as the prongs extend toward their upper edge 66. Accordingly, the gap between the prongs 62 and the front face 50 of the head 36 is larger adjacent the upper end of the prongs 62. This arrangement makes it easier to grab the suspended display holder 16 and helps guide the suspended display holder into secure engagement with the gripping head 36 as the spring 60 slides the clamp member 48 into engagement with the suspended display holder. In addition, this arrangement also enables the clamp member 48 to be brought into engagement with suspended display holders having lower flanges of different thickness.

For controlling the movement of the clamp member 48 between the released and engaged positions, the actuating cord 38 is connected at one end to the clamp member 48. As shown in FIG. 1, the opposing end of the actuating cord 38 is disposed adjacent the lower end of the handle 34 such that a user may operate the manipulating tool 14 by grabbing the handle 34 with one hand while using the other hand to retract the clamping member 48 via the actuating cord 38. The essentially parallel orientation of the slide 52, spring 60 and actuating cord 38 enables forces to be more directly exerted in the retraction direction of the clamp member 48, thereby facilitating the retraction of the clamp member. In particular, when an operator pulls on the actuating cord 38, the force which is applied to the clamp member 48 is substantially parallel to the direction in which the clamp member slides, so as to effect retraction with minimal effort. Thus, the tool 14 of the present invention requires a relatively small amount force to operate as compared with conventional gripping heads having pivoting jaws.

In order to mount a suspended display on an overhead structure, the user first pulls the actuating cord 38 so as to retract the clamp member 48 counter to the force of the spring 60 into the release position. The user then manipulates the handle 34 in order to bring the gripping head 36 into engagement with the suspended display holder 16 with the channel member 46 of the gripping head 36 overlying the upper portion 22 of the suspended display holder 16. The user can then release the actuating cord 38 in order to allow the spring to slide 60 the clamp member 48 into engagement with the suspended display holder 16 thereby securely capturing the suspended display holder. The user can then manipulate the handle 34 in order to bring the magnet 30 into engagement with a metallic portion of the overhead structure in the desired location. Once the magnet 30 is engaged in the desired location, the user can then disengage the gripping head 36 from the suspended display holder 16 by pulling the actuating cord 38 to thereby slide the clamp member 48 into the release position.

To remove or relocate the suspended display holder 16 from the overhead support structure, merely requires the user to first pull the actuating cord 38 to slide the clamp member 48 into the release position. While continuing to hold the clamp member 48 in the release position, the user manipulates the handle 34 in order to bring the channel member 46 of the gripping head 36 into engagement with the upper portion 22 of the suspended display holder. Once the channel member 46 is placed in overlying relation relative to the suspended display holder 16, the user may release the actuating cord 34 to bring the clamp member 48 into engagement with the display holder 16. Finally, the user can use the handle 34 to tilt the gripping head 36 in order to twist the suspended display holder 16 about its longitudinal axis breaking the magnetic attraction between the magnet 30 and the metallic portion of the overhead structure.

From the foregoing, it can be seen that the present invention provides a simple, easy to operate and convenient tool which can be used by an individual to mount and remove a suspended display system to an overhead structure. The manipulating tool also securely and firmly engages the suspended display system thereby facilitating mounting and removing of the display system.

While the manipulating tool of the present invention has been described in connection with a suspended display system which may be releasably secured to a ceiling via magnets, it will be readily appreciated that the tool could be used with any type of suspended display system which can be attached to and removed from an overhead surface through simple hand manipulation of the tool. Moreover, while this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and the scope of the invention as defined by the following claims.

What is claimed is:

1. An apparatus for manipulating a suspended display holder such that a user can mount and remove the suspended display holder from an overhead support, the apparatus comprising:

an elongated handle, a gripping head arranged on an upper end of the elongated handle, the gripping head having an elongated channel-shaped portion which is configured to engage a relatively elongate section of the suspended display holder and a clamp member slidably mounted to an exterior front surface of the gripping head for movement relative to the channel-shaped portion between a retracted position for enabling the channel-shaped portion to be brought into and out of engagement with the suspended display holder and an engaged position wherein the clamp member and the channel-shaped portion engage the suspended display holder and thereby securely grasp the suspended display holder, wherein the clamp member includes a flange which engages a slot in the gripping head in order to guide the clamp member as it moves between the retracted and engaged positions, a spring arranged on the gripping head to bias the clamp member towards the engaged position, and an actuating cord connected to the gripping head for controlling movement of the clamp member between the retracted and engaged positions.

2. The apparatus according to claim 1 wherein the channel-shaped portion is disposed adjacent an upper end of the gripping head.

3. The apparatus according to claim 2 wherein the spring is arranged on the gripping head between the clamp member and the channel-shaped portion to bias the clamp member towards the engaged position.

4. The apparatus according to claim 2 wherein the spring is arranged on the gripping head below the clamp member and the channel-shaped portion to bias the clamp member towards the engaged position.

5. The apparatus according to claim 1 wherein the clamp member includes at least one prong which engages the suspended display holder when the clamp member is in the engaged position.

6. The apparatus according to claim 1 wherein the spring is connected to the flange.

7. The apparatus according to claim 1 wherein the actuating cord is arranged such that a force can be applied on the clamp member through the actuating cord substantially parallel to the direction of movement of the clamp member.

8. The apparatus according to claim 7 wherein the spring is arranged substantially parallel to the direction of movement of the clamp member.

9. An apparatus for manipulating a suspended display holder such that a user can mount and remove the suspended display holder from an overhead support, the apparatus comprising:

an elongated handle, a gripping head arranged on an upper end of the elongated handle, the gripping head having a channel-shaped portion which is adapted to engage the suspended display holder, a clamp member slidably mounted to the gripping head for movement between a retracted position for enabling the channel-shaped portion to be brought into and out of engagement with the suspended display holder and an engaged position wherein the clamp member and the channel-shaped portion engage the suspended display holder and thereby securely grasp the suspended display holder, a spring arranged on the gripping head between the clamp member and the channel-shaped portion to bias the clamp member towards the engaged position, and an actuating cord connected to the gripping head for controlling movement of the clamp member between the retracted and engaged positions.

10. The apparatus according to claim 9 wherein the channel-shaped portion is disposed adjacent an upper end of the gripping head.

11. The apparatus according to claim 9 wherein the clamp member includes at least one prong which engages the suspended display holder when the clamp member is in the engaged position.

12. The apparatus according to claim 9 wherein the clamp member includes a flange which engages a slot in the gripping head in order to guide the clamp member as it moves between the retracted and engaged positions.

13. The apparatus according to claim 12 wherein the spring is connected to the flange.

14. The apparatus according to claim 9 wherein the actuating cord is arranged such that a force can be applied on the clamp member through the actuating cord substantially parallel to the direction of movement of the clamp member.

15. The apparatus according to claim 14 wherein the spring is arranged substantially parallel to the direction of movement of the clamp member.

* * * * *